United States Patent [19]

Lewis

[11] 3,868,942

[45] Mar. 4, 1975

[54] COOKING APPARATUS

[76] Inventor: Almor Lewis, 4398 Seebaldt, Detroit, Mich. 48204

[22] Filed: Jan. 10, 1972

[21] Appl. No.: 216,656

[52] U.S. Cl............................................. 126/25 R
[51] Int. Cl........................... A47j 37/07, F24b 3/00
[58] Field of Search............ 126/25 R, 28, 25 A, 9 R

[56] References Cited
UNITED STATES PATENTS

| 202,963 | 5/1878 | Vollbrecht | 126/9 R |
|---|---|---|---|
| 203,963 | 5/1878 | Vollbrecht | 126/9 R |
| 2,568,022 | 9/1951 | Parker | 126/25 R |
| 2,718,845 | 9/1955 | Dudley | 126/25 A X |
| 2,792,773 | 5/1957 | Barker | 126/9 X |
| 2,902,026 | 9/1959 | Hathorn, Jr. | 126/25 R |
| 3,049,971 | 8/1962 | Diack | 126/25 R X |
| 3,683,791 | 8/1972 | Rast, Jr. | 126/25 R X |

Primary Examiner—Carroll B. Dority, Jr.
Assistant Examiner—Harold Joyce
Attorney, Agent, or Firm—David A. Maxon

[57] ABSTRACT

This invention relates to a barbecue pit apparatus. It comprises a metallic drum that has been cut out to provide appropriate apertures for inserting a grill apparatus upon which meat or other food is grilled. The grill apparatus is readily removable for insertion of coals and/or igniting articles such as lighter fluid, twigs, or paper. The apparatus further includes a stack which has an entry within the chamber of the barbecue pit above the rack holding the food. The apparatus also includes a sliding vent apparatus which enters into the aforementioned chamber below the rack holding the food and near the lower or bottom portion of coals inserted therein for cooking purposes.

1 Claim, 4 Drawing Figures

PATENTED MAR 4 1975          3,868,942

COOKING APPARATUS

This application relates generally to a cooking apparatus. More particularly it relates to a lightweight barbecue pit apparatus.

In the prior art many cooking apparatus have been provided. More particularly a number of different types of barbecue pits have been provided. One of the problems of the prior art devices is that they have been either heavy or costly to manufacture. Another problem is that they fail to cook the meat or vegetables in a rapid time and still maintain an outdoor type of flavor that people enjoy. Still another difficulty is that they are either in a fixed position or they are difficult to maintain in a fixed position or do not have the flexibility of either being highly portable and lightweight or readily fixed without a great deal of cost and effort. Still another difficulty with prior art devices is the maintenance of heat during the cooking operation in order to have a rapid cooking and at the same time to reduce the amount of burning so as not to use up the fuel or coals involved. The latter has been a particular problem in barbecue apparatus utilizing coals or briquettes as opposed to using a gas burning or wood burning.

Accordingly, it is an object of this invention to provide a lightweight, inexpensive, uncomplicated barbecue pit apparatus.

It is another object of this invention to provide a lightweight, inexpensive, uncomplicated barbecue apparatus that cooks food in a relatively rapid amount of time.

It is another object of this invention to provide a barbecue apparatus that utilizes the maximum amount of heat in a minimum amount of time of fuel and also of other apparatus or other articles to be burned such as hickory without consuming a substantial amount of that hickory or that fuel during that process and yet thoroughly permeating the food to be cooked with the aforesaid hickory flavor and/or heat so as to cook thoroughly or to flavor thoroughly or both.

These and other objects of this invention are achieved by the provision of an apparatus comprising a drum having a lid in the upper quadrant thereof that is hinged near the top surface thereof and having an edge or guarding metal on the lower lid thereof to reduce the lower translation of the lid and providing a handle thereof and also comprising a venting apparatus comprising a stack apparatus that can be readily composed of components such as that used in normal 2 inch piping where the entry to the aforesaid piping is near the upper half of the drum apparatus and above the levels of grill to be described hereinafter and also providing a vent on the lower or bottom portion of the drum which in turn closes a chamber containing the fuels such as wood and/or briquettes and/or charcoal and/or coals providing a draft underneath the aforesaid fuel and further comprising in one embodiment foldable legs such as that found normally under a table as well known in the table art or in a further embodiment can be fixed to a ledge or to a wall or to some other part of a patio. In the aforesaid embodiment utilizing foldable table legs the entire apparatus can be folded and in one embodiment the depth of the folded legs is no more than 10 percent of the height of the drum apparatus and the tension of the upper draft apparatus being a vertical chimney or a chimney stack extends no more than 20 percent of the drum. Also the stack can be folded down.

These and other objects will be understood from the following description and specification of embodiments of this invention.

ON THE DRAWINGS

Figure 1:
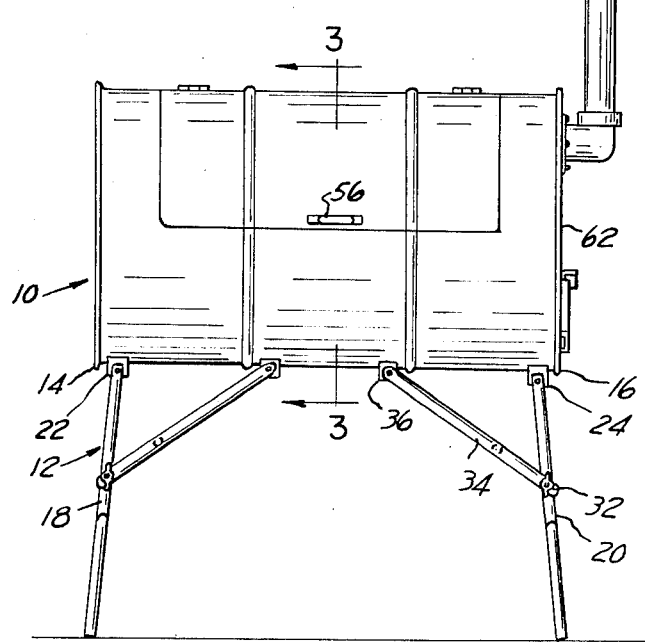
FIG. 1 is a three-dimensional view from the bottom quadrant of the preferred embodiment of this invention in its folded alternative embodiment.

Before explaining the present invention in detail, it is to be understood that the invention is not limited in its application to the details in construction and arrangement of parts illustrated in the accompanying drawings since the invention is capable of other embodiments and of being practiced or carried out in various ways.

Also it is to be understood that the phraseology terminology employed herein are for the purpose of description and not of limitation.

AS SHOWN ON THE DRAWINGS

The preferred embodiment of this invention comprises a substantially right circular cylindrical drum member 10. The drum member 10 is preferably a number 1 steel drum of the type often used for transporting liquids such as cooking oils.

Legs 12 are attached to the drum 10 near bottom edges 14 and 16. The legs 12 comprise left leg members 18 and 20 rotatably connected to brackets 22 and 24 respectively. Brackets 22 and 24 are fixedly attached to the drum member 10 near previously mentioned edge portions 14 and 16 respectively. Each of the leg portions 18, 20 comprise a pair of vertically extending portions 26 attached to a yoke member 28 which in turn is rotatably and hingedly attached to brackets 22, 24. An aperture 30 near that portion of yoke 28 proximate the vertical members 26 receives pivot members 32. Pivot members 32 may be wing nut and bolt combinations.

The pivot member 32 provides a pivot point for rotatably attaching one of the legs 18, 20 to a strut member 34. The strut member 34 is rotatably attached near its end 36 opposite from pivot member 32 to a bracket 38 which is fixedly attached to the drum 10 near the center of the bottom of the drum 10.

The legs 12 can be viewed generally as providing two vertical stem portions on each side and a yoke that is rotatably attached about one-third the way up from the ground of each leg portion to the drum and another rotatable U-shaped metal channel member that is rotatably attached to the aforementioned first rotatable edge (the yoke) and which is in turn rotatably attached to brackets that are fixedly attached to the bottom of the drum.

These legs 18 can be those such as folding banquet table legs made by EMCO Specialties, Inc., 300 New York Avenue, Des Moines, Iowa and referred to as catalog number BN-29 inches. A stack assembly 40 comprises a section 42 of pipe which can be 2 inch diameter pipe used in the plumbing art. The pipe section is welded to an elbow 44 which can be an elbow used to mate with two inch diameter pipe in the plumbing art. This elbow is referred to in the plumbing art as a street L. This elbow has a threaded section to receive the pipe and another threaded section which rotatably attaches or screws into the drum where a cap portion has been removed from the drum. The cap portion has internally threaded portions on an annular ring section 46.

There are bracket portions that are riveted to the drum such as bracket portions 22, 24 aforementioned as well as brackets 48 which are riveted to the drum for holding rails 50 described hereinafter.

A portion of the upper left quadrant of the barbecue pit is cut open. The upper lid 52 is hingedly attached to the drum near the top of the drum 10. Part of the hinge assembly 54 comprises aluminum strips that are secured by means of rivets to the drum. There are also strips provided along the edge of the aperture from which the lid was cut to provide a flush limit on a downward travel when the lid is rotated about the hinge portion 54 to a closed position of the lid shown in FIG. 1. The handle 56 is fixedly attached to the lid for manual rotation of the lid about the aforementioned hinge portion.

Rails 50 are provided approximately midway in the drum and are secured by means of pop rivets to the side of the drum.

Figure 2:
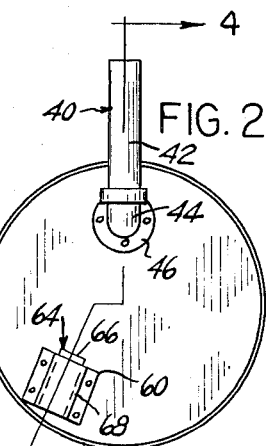
FIG. 2 is a three-dimensional view from the front of the preferred embodiment of this invention.
Figure 4:
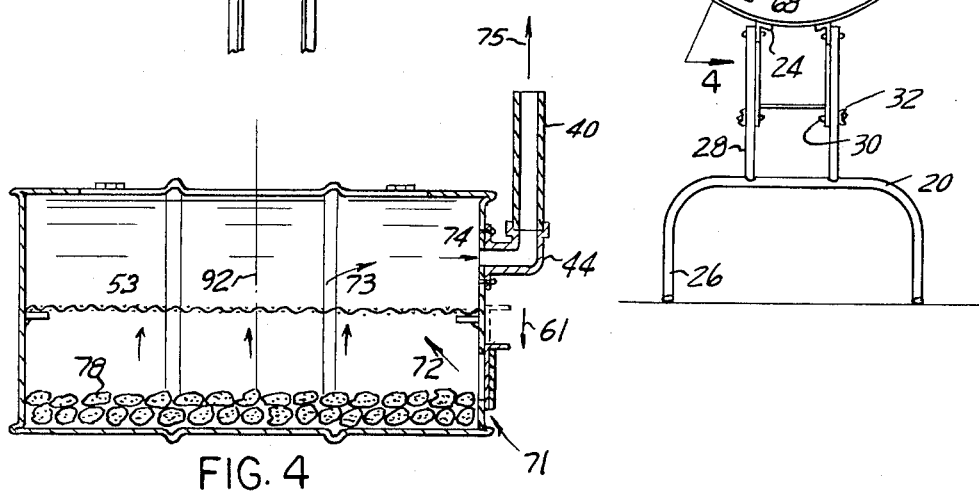
FIG. 4 is a cross-sectional view taken along the lines 3—3 of FIG. 3 showing essentially the side view of the preferred embodiment of this invention.

The stack assembly 40 can be rotated from the upper position shown in FIGS. 1, 2 and 4 to a downward position indicated by the arrow 61 in FIG. 4 by rotating the entire assembly through the threads provided in the elbow section 44.

A metal mesh 53 is provided to rest on the rails 50. The mesh 53 can be assembled or replaced selectively by the operator. The grille may be as shown on the drawings and as sold by the Ronson Steel Company of Detroit, Mich.

Bracket portions 60 are provided near the end 62 of drum 10 near the bottom of the drum and a plate 64 is provided to slide within the bracket 60 to provide a selectively operable vent near the bottom of the barbecue pit. The handle may be provided near the top 66 of the sliding door 64. The brackets 60 are secured to the drum 10 by means of pop rivets and have a toggle portion 68 to go over the door 64 in a manner as commonly used for toggled aluminum sections in providing accessories to exterior skin of aircraft.

Figure 3:
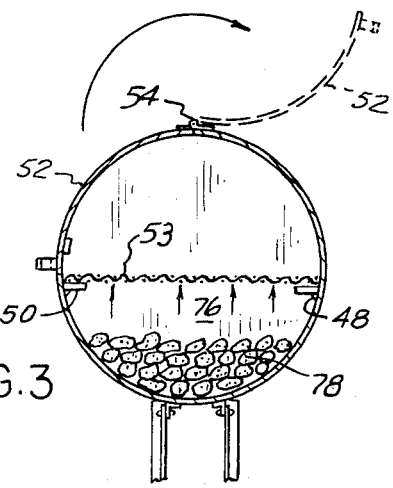
FIG. 3 is a transverse section of the line taken along the lines 2—2 showing essentially the front view of the apparatus.

In the operation of the preferred embodiment of the invention described above it can be appreciated that by opening the vent door 64 to a predetermined position an air flow can be provided in the direction of arrows 71, 72, 73, 74 and 75 as illustrated in FIG. 4 or in an upper direction indicated by the arrow 76 in FIG. 3. The bedof hot coals 78 shown in FIGS. 3 and 4 illustrate how excellent venting is provided during operation of the invention. The venting can be changed selectively by opening and closing the lid 52 at predetermined times. However, in the preferred operation of the invention, the lid remains closed until the meat resting on grille 53 is done. By providing an aluminum drum or a steel drum with aluminum paint such as heat resistant 1000 ° paint on the surfaces inner and outer of the drum 10 appropriate reflection surfaces for reflection of heat and concentration of heat within the cooking area provides a rapid cooking operation of food while providing venting as previously described is achieved.

In an alternative preferred embodiment of the invention, the drum 10 is a clean metal surface free of any paint in the interior thereof. In such a case, it is preferred that no heat resistant paint be provided on the inside of such a drum in the practice of this invention.

In the preferred embodiment of this invention such heat resistant paint used is 1000° proof provided by the Permite Aluminum Paint Hot Seal No. 1900 marketed by the Permite Aluminum Paint Company of Decatur, Ga.

In the preferred embodiment of this invention the mesh 53 is provided in two pieces divided in half indicated by broken line 92 in FIG. 4 to provide ease of entry of the grille and removal for cleaning purposes.

From the foregoing specifications of the preferred embodiment of this invention and its operation, it can be appreciated that a novel and improved barbecue apparatus has been provided, wherein the operation of this apparatus a preselected range of heat can be maintained in a uniform manner throughout the cooking region and throughout the cooking period for either a short or prolonged period of time.

I claim:

1. In an outdoor barbecue apparatus the improvements comprising:
   a right circular cylindrical drum member having a substantially uniform diameter throughout its length and having a central axis extending horizontally;
   said drum member having end flat circular faces in a vertical plane;
   a hinged lid having a lip on the lower edge thereof, the upper half of said drum member being hinged and rotatable about a horizontal axis directly above and parallel to said central axis;
   brackets extending horizontally inward slightly below the lip of said hinged lid;
   means limiting the downward travel of said hinged lid;
   a grille resting on said brackets;
   a first venting assembly substantially below said grille on one of said flat circular faces and having a slidable door slidable vertically upwards;
   a knob on said slidable door for manual actuation of the door;
   a chimney member having a vertical opening above said grille at one end of said drum in the face thereof;
   said chimney member selectively extending vertically upward from said opening;
   foldable legs supporting said drum;
   a silver colored heat resistant paint provided on the exterior surfaces and interior surfaces of the drum member;
   said grille being divided into substantially two equal portions;
   said foldable legs being foldable so as to substantially reduce overall height of the barbecue apparatus during moving of the apparatus;
   said slidable door having sufficient friction with brackets holding said door to side of said drum, operable to hold said door in a preselected manually placed position.

* * * * *